United States Patent
Schulze

(10) Patent No.: US 9,739,182 B2
(45) Date of Patent: Aug. 22, 2017

(54) HYDRAULIC VALVE AND CAM PHASER

(71) Applicant: Hilite Germany GmbH, Marktheidenfeld (DE)

(72) Inventor: Dietmar Schulze, Muenzenberg (DE)

(73) Assignee: Hilite Germany GmbH, Marktheidenfeld (DE)

( * ) Notice: Subject to any disclaimer, the term of this patent is extended or adjusted under 35 U.S.C. 154(b) by 192 days.

(21) Appl. No.: 14/833,065

(22) Filed: Aug. 22, 2015

(65) Prior Publication Data

US 2016/0230611 A1 Aug. 11, 2016

(30) Foreign Application Priority Data

Oct. 31, 2014 (DE) .................. 10 2014 115 903

(51) Int. Cl.
*F01L 1/34* (2006.01)
*F01L 1/344* (2006.01)
*F16K 31/122* (2006.01)

(52) U.S. Cl.
CPC .......... *F01L 1/3442* (2013.01); *F16K 31/122* (2013.01); *F01L 2001/34426* (2013.01)

(58) Field of Classification Search
CPC .......... F01L 1/3442; F01L 2001/34426; F16K 31/122
USPC ................. 123/90.17, 90.18; 137/625.68
See application file for complete search history.

(56) References Cited

U.S. PATENT DOCUMENTS

| | | | | |
|---|---|---|---|---|
| 8,684,038 | B2* | 4/2014 | Schudt | F16K 31/0613 137/625.68 |
| 9,021,997 | B2* | 5/2015 | Welte | F01L 1/3442 123/90.17 |
| 9,157,343 | B2* | 10/2015 | Kobayashi | F01L 1/344 |
| 9,394,809 | B2* | 7/2016 | Gruber | F01L 1/3442 |
| 9,422,838 | B2* | 8/2016 | Kohler | F01L 1/3442 |
| 2011/0220046 | A1* | 9/2011 | Welte | F01L 1/3442 123/90.15 |
| 2012/0048398 | A1* | 3/2012 | Schudt | F16K 31/0613 137/514 |

FOREIGN PATENT DOCUMENTS

DE 102012106096 A1 5/2014

* cited by examiner

*Primary Examiner* — Eric Keasel
(74) *Attorney, Agent, or Firm* — Von Rohrscheldt Patents

(57) ABSTRACT

A hydraulic valve for a cam phaser including a pressure balanced hollow piston that is arranged axially movable, wherein the hollow piston at its end oriented towards the pressure medium connection includes a first piston section with a first small outer diameter, and adjacent to the first piston section a second piston section with a second large outer diameter, and a third piston section with a third medium outer diameter, wherein the hollow piston includes a respective pressure surface for pressure compensation at the first piston section and at the third piston section which are respectively loadable with an axial force that is oriented away from the pressure medium connection when the hollow piston is loaded with pressure, wherein a resultant force of the axial forces impacts the hollow piston, and another pressure surface is provided at the second piston section of the hollow piston.

17 Claims, 2 Drawing Sheets

HYDRAULIC VALVE AND CAM PHASER

RELATED APPLICATIONS

This application claims priority from and incorporates by reference German patent application DE 10 2014 115 903.9 filed on Oct. 31, 2014.

FIELD OF THE INVENTION

According to patent claim the invention relates to a hydraulic valve for a cam phaser and to a cam phaser.

BACKGROUND OF THE INVENTION

The German patent application DE 10 2012 106 096 A1 discloses a cam phaser with a hydraulic valve which includes a bore hole with shoulders and operating connections originating from the bore hole. A pressure balanced hollow piston is axially moveable within the bore hole, wherein the hollow piston with a first external diameter is moveable within a bore hole section that has a sealing tolerance and the hollow piston has an enveloping surface with a large outer exterior diameter in a portion a first operating connection wherein the large outer diameter is adjacent to the first outer diameter and the hollow piston has an enveloping surface with a small outer diameter in a portion of the other operating connection, wherein a respective inlet edge and a respective outlet edge originate from each of the two enveloping surfaces. The two inlet edges are oriented away from each other and the outlet edges are oriented towards each other so that a supply pressure introduced into a cavity of the hollow piston contacts a projected circular surface on one side which is formed by the small outer diameter so that a force becomes effective in an axial direction, whereas the supply pressure loads a projected annular surface which is formed by the large exterior diameter minus the first exterior diameter in order to provide a cam phaser with a hydraulic valve, wherein the two operating connections are axially adjacent on one side relative to the pressure medium connection of the hydraulic valve. The proposed hydraulic valve is only producible with significant complexity.

BRIEF SUMMARY OF THE INVENTION

Thus it is an object of the invention to improve the hydraulic valve recited supra with respect to its configuration and functionality. In particular manufacturing complexity and flow resistance of the valve shall be improved. This object is achieved according to the invention through the features of patent claim 1.

The hydraulic valve according to the invention for a cam phaser includes a valve housing which includes a bore hole with shoulders with two operating connections configured as transversal bore holes originating from the bore hole with shoulders, a pressure balanced hollow piston that is arranged axially moveable within the bore hole between a first and a second end position and a piston inlet for axially introducing a pressure medium into a cavity of the hollow piston wherein the piston inlet is connectable with a pressure medium connection, wherein the pressure medium connection is formed by a housing inlet of the valve housing.

Additionally the hydraulic valve includes a piston outlet extending from the cavity of the hollow piston for connecting the pressure medium connection with one of the operating connections, two tank connections for connecting the operating connections with a pressure medium reservoir and a plunger for axially adjusting the hollow piston through an actuator, wherein the hollow piston at its end oriented towards the pressure medium connection includes a first piston section with a first small outer diameter, adjacent to the first piston section a second piston section with a second large outer diameter and a third piston section with a third medium outer diameter, wherein the three piston sections are respectively moveable in a housing section of the valve housing that has a sealing tolerance. The designations small, medium and large define the size relationships of the outer diameters relative to each other.

For pressure balancing the hollow piston includes a respective pressure surface at the first piston section and the third piston section which are respectively loadable with an axial force that is oriented away from the pressure medium connection when the hollow piston is loaded with pressure wherein a resultant force of the axial forces impacts the hollow piston and another pressure surface is provided at the second piston section of the hollow piston wherein this other pressure surface is the only pressure surface of the hollow piston which is loadable with an axial force that is oriented towards the pressure medium connection, wherein forces impacting the hollow piston from both axial directions are essentially equal in size so that the force at the first piston section is essentially compensated by the forces that are provided between the operating connections.

Put differently the hollow piston is pressure balanced when pressure loaded by pressure medium introduced by the pressure medium connection due to the balancing of the axial forces and axial forces at the hollow piston of the hydraulic valve are independent from the pressure of the pressure medium.

Due to the proposed configuration with different housing sections of the valve housing and the respective piston sections of the hollow piston with pressure surfaces configured thereon it is possible to reduce the manufacturing complexity of the hydraulic valve and in particular to produce and mount the essentially rotation symmetrical hollow piston in a cost effective manner. Advantageously the hollow piston does not have any bevels which would cause flow disadvantages.

Advantageously the first housing section is formed by a bushing that is arranged in a bore hole of the valve housing. The first housing section can thus be provided in the valve housing in a simple manner and mounting the hollow piston can be simplified. Thus, the bushing can be introduced in a simple manner through impression or through a pin connection. Alternatively the third housing section can be formed by a bushing that is arranged in the bore hole of the valve housing.

According to an advantageous embodiment of the invention a transversal bore hole originating from the bore hole is axially adjacent to the pressure medium connection wherein the transversal bore hole forms a first tank connection wherein the first operating connection and the second operating connection follow after the tank connection, wherein a second tank connection is arranged axially after the second operating connection wherein the second tank connection is formed by an axial housing outlet. This connection sequence facilitates providing a hydraulic valve that is very short in axial direction. By the same token the second tank connection facilitates lubricating the actuator coupled to the plunger in the portion of the housing outlet.

Advantageously the pressure surface at the first piston section is formed by a projected circular surface and the pressure surfaces at the second and third piston section are formed by annular surfaces which are oriented towards each other. Additional bore holes in the hollow piston or in the valve housing thus do not have to be provided for forming the required pressure surfaces.

According to an advantageous embodiment of the invention a first annular cavity for connecting the first operating connection with the first tank connection is provided between the bushing and a shoulder that is formed between the first and the second piston section.

Advantageously a reset spring for the hollow piston is arranged in the first annular cavity between the shoulder and the bushing and the spring preload of the reset spring is adjustable through the bushing in another advantageous embodiment.

Between the second and the third piston section a second annular cavity is advantageously required which is configured for connecting the operating connections with the pressure medium connection through the piston outlet as a function of a position of the hollow piston.

According to an advantageous embodiment a third annular cavity is provided between the third piston section and the housing outlet wherein the third annular cavity is configured for connecting the operating connection with the second tank connection. Thus, additional radial bore holes in the valve housing can be omitted.

The third annular cavity can be provided in a simple manner by providing shoulders in the third piston section.

The housing inlet can be provided axially or radially in the valve housing according to an advantageous embodiment of the invention.

Arranging a check valve in the housing inlet can prevent a backflow of the pressure medium in a direction towards the pressure medium connection in a simple and safe manner. The check valve can thus be provided for example as a ball check valve or as a plate check valve.

Advantageously the plunger can be provided coupled with the hollow piston. However; the plunger can be integrally configured in one piece with the hollow piston.

The hydraulic valve according to the invention is used in particular as a central valve radially inside a rotor of a cam phaser having a stator and a rotor that is rotate able relative to the stator between a first end position and a second end position for adjusting a cam shaft of an internal combustion engine. However, it is also possible to arrange the hydraulic valve outside of the rotor as a decentralized valve.

BRIEF DESCRIPTION OF THE DRAWINGS

Further advantages of the invention can be derived from the additional patent claims, the description and the drawing figure. The invention is subsequently described in more detail with reference to drawing figures, wherein:

DETAILED DESCRIPTION OF THE INVENTION

Figure 1:
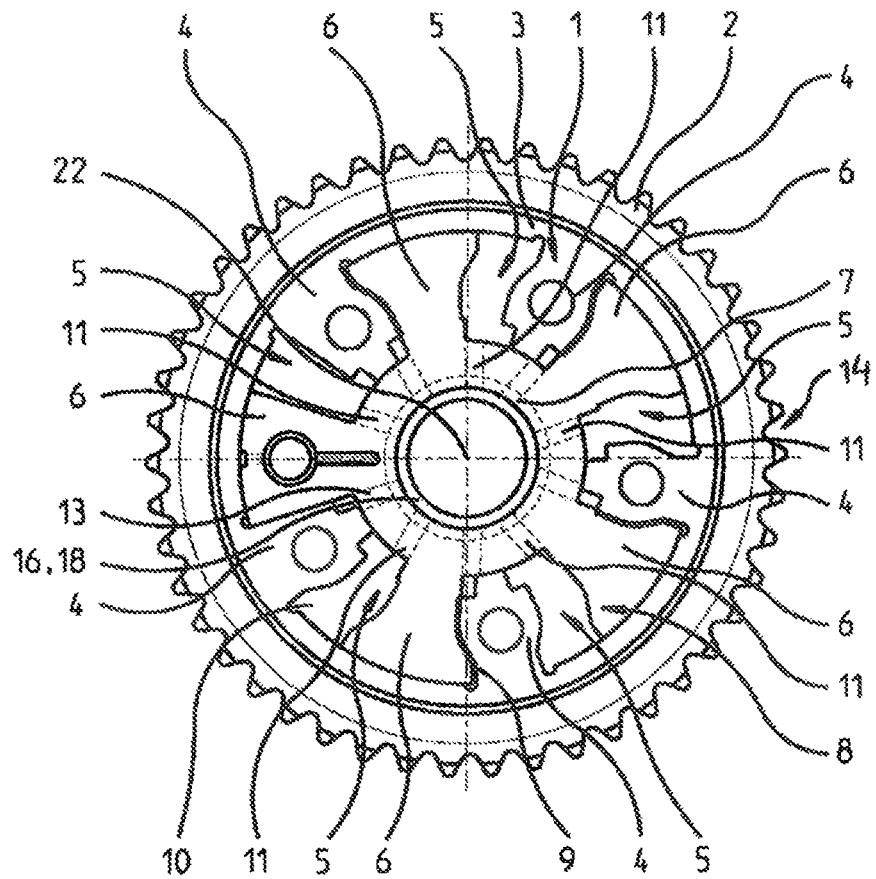
FIG. 1 illustrates a cross section of the cam phaser according to the invention.

A cam chaser 14 according to FIG. 1 is used for a continuous variation of an angular position of a cam shaft 18 relative to a drive gear 2 during operation of an internal combustion engine. Rotating the cam shaft 18 moves the opening and closing times of the gas control valves so that the internal combustion engine delivers optimum power at the respective speed. The cam phaser 14 includes a cylindrical stator 1 which is connected torque proof with the drive gear 2. In the embodiment the drive gear 2 is a chain sprocket over which a chain is run that is not illustrated in more detail. The drive gear 2 can also be a timing belt cog over which a drive belt is run as a drive element. A stator 1 is operatively connected with a crank shaft through this drive element and the drive gear 2.

The stator 1 includes a cylindrical stator base element 3 wherein bars 4 protrude from an inside of the stator base element in a radially inward direction at uniform intervals. Intermediary spaces 5 are formed between adjacent bars 4 into which a pressure medium is introduced through a centrally arranged hydraulic valve 30 which is illustrated in more detail in FIG. 2. Blades 6 which protrude in radially outward direction from a cylindrical rotor hub 7 of a rotor 8 are arranged between adjacent bars 4. These blades 6 divide the intermediary spaces 5 between the bars 4 respectively into two pressure cavities 9 and 10. The first pressure cavity 9 is associated with an adjustment in an "early" direction whereas the second pressure cavity 10 is associated with an adjustment in a "late" direction.

The bars 4 contact an outer enveloping surface of the rotor hub 7 in a sealing manner with their faces. The blades 6 in turn contact the cylindrical inner wall of the stator base element 3 with their faces in a sealing manner.

The rotor 8 is connected torque proof with the cam shaft 18. In order to change an angular position between the cam shaft 18 and the drive gear 2 the rotor 8 is rotated relative to the stator 1. Thus, the pressure medium in the pressure cavities 9 or 10 is pressurized as a function of the desired direction of rotation while the respective other pressure cavities 10 or 9 are relived towards the tank T. In order to pivot the rotor 8 relative to the stator 1 counter clock wise into the illustrated position the hydraulic valve 30 pressurizes an annular first rotor channel in the rotor hub 7. From the first rotor channel additional channels 11 lead into the pressure cavities 10. This first rotor channel is associated with a first operating connection A. In order to pivot the rotor 8 clockwise the hydraulic valve pressurizes a second annular rotor channel in the rotor hub 7 wherein channels lead into the second annular rotor channel. This second rotor channel is associated with a second operating connection B. The two rotor channels are arranged axially offset from one another which respect to a central axis 22 so that the two rotor channels are arranged behind one another in the drawing plane of FIG. 1.

The cam phaser 14 is placed onto the cam shaft 18 that is configured as hollow tube 16. Thus the rotor 8 is placed onto the cam shaft 18. The hollow tube 16 includes bore holes which hydraulically connect the rotor channels associated with the two operating connections A, B with transversal bore holes 28, 29 of the hydraulic valve 30.

Figure 2:
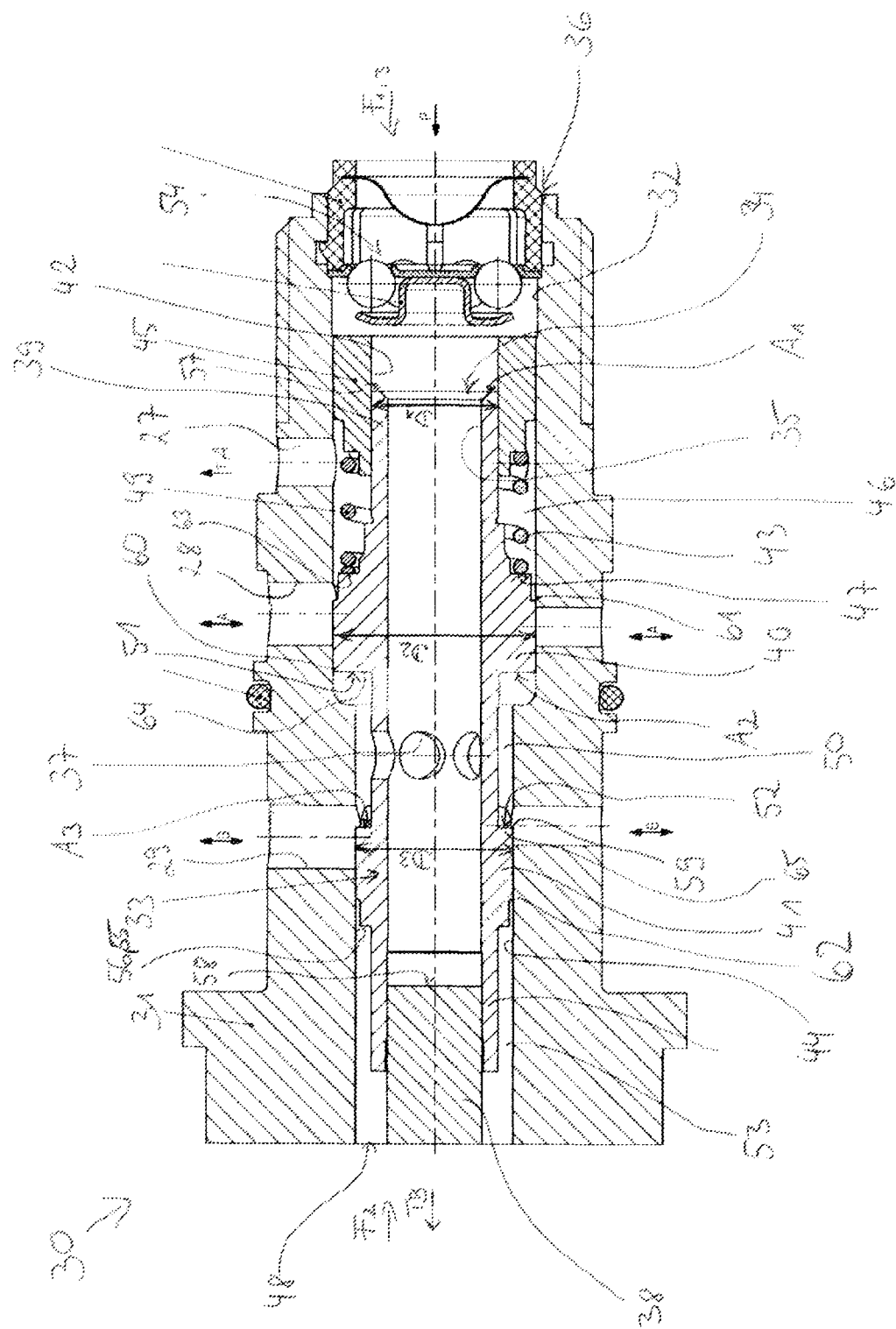
FIG. 2 illustrates the hydraulic valve for controlling the cam phaser according to FIG. 1 in a longitudinal sectional view.

Thus, the cam phaser 14 is pivotable by the hydraulic valve 30 which is illustrated in FIG. 2 in a longitudinal sectional view which is used in particular as a central valve radially within the rotor 8 of the cam phaser 14. However, it is also possible to arrange the hydraulic valve 30 outside of the rotor 8.

As can be derived from FIG. 2 the hydraulic valve 30 includes a valve housing 31 which includes a bore hole 32 with shoulders with operating connections A, B configured as transversal bore holes 28, 29 originating from the bore hole with shoulders. A hollow piston 33 that is pressure balanced between a first and a second end position is arranged axially moveable within the bore hole 32, wherein the hollow piston includes a piston inlet 34 for axially introducing a pressure medium into a cavity 35 of the hollow piston 33. The piston inlet 34 is connectable with a pressure medium connection P which is formed by an axially configured housing inlet 36 of the valve housing 31. Alternatively the housing inlet can also be configured radially within the valve housing 31.

Furthermore, the hydraulic valve 30 includes a piston outlet 37 leading out of the cavity 35 of the hollow piston 33, the piston outlet configured as plural radial bore holes for connecting the pressure medium connection P with one of the operating connections A, B as a function of the position of the hollow piston 33 in the valve housing 31.

Two tank connections TA, TB are used respectively for connecting the operating connections A, B with a pressure medium reservoir which is not illustrated.

As apparent from FIG. 2 a transversal bore hole 27 originating from the bore hole 32 is arranged after the pressure medium connection P in axial direction forming a first tank connection TA, thereafter the associated first operating connection A is arranged and thereafter the second operating connection B is arranged and thereafter the associated second tank connection TB is arranged in axial direction. This connection sequence facilitates a hydraulic valve 30 which is configured axially very short.

The second tank connection TB is formed by an axial housing inlet 48 of the valve housing 31 so that a lubrication of a non illustrated actuator is facilitated simultaneously, wherein the actuator is provided for axially adjusting the hollow piston 33 through a plunger 38 connected with the hollow piston 33. Alternatively the plunger 38 can also be provided integrally in one piece together with the hollow piston 33.

The hollow piston 33 includes a first piston section 39 with a first small exterior diameter D1 at an end of the hollow piston that is oriented towards the pressure medium connection P wherein the small outer diameter D1 is moveable with sealing tolerance in a first housing section 42 of the valve housing 31. For this purpose the valve housing 31 includes a bushing 45 which forms the first housing section 42 and which can be introduced into the bore hole 32 by pressing it in or with an alignment pin connection.

Adjacent to the first piston section 39 a second piston section 40 with a second large outer diameter D2 and a third piston section 41 with a third medium outer diameter D3 is provided which are moveable with sealing tolerance in a second and third housing section 43, 44 of the valve housing 31. The designations small, medium and large define size relationships of the exterior diameters relative to each other, wherein: D2>D3>D1.

An alternative embodiment of the invention which is not illustrated provides the first housing section 42 through a shoulder of the bore hole 32 and the third housing section 44 through a bushing in order to facilitate mounting the hollow piston 33 into the valve housing 31.

For pressure balancing the hollow piston 33 respectively includes a pressure surface A1 and 43 at the first piston section 39 and at the third piston section 41 which are respectively loadable with an axial force F1 and F3 that is oriented away from the pressure medium connection P when the hollow piston 33 is pressure loaded.

The two forces F1 and F3 impact the hollow piston 33 as a combined force F1, 3.

Another pressure surface A2 that is provided at the second piston section 40 however is loadable with an axial force F2 that is oriented towards the pressure medium connection P. The pressure surface A2 is the only surface that is loadable with an axial force in the direction P. The forces F1 and F3 are configured so that the forces F1, 3, F2 impacting the hollow piston 33 from both axial directions essentially have the same size which renders the hollow piston 33 force balanced under a pressure loading with pressure medium introduced through the pressure medium connection P since the two forces F1, 3 and F2 compensate each other and axial forces for example from the actuator or from a reset spring 49 impact the hollow piston 33 irrespective of the pressure of the pressure medium.

The pressure surface A1 at the first piston section 39 as evident from FIG. 2 is formed by a projected circular surface since the pressure medium loads an annular surface 57 formed at the first piston section 39 and a circular surface 58 of the plunger 38.

The pressure surfaces A2 and A3 are configured as annular surfaces 64, 65 oriented towards each other at the second and third piston section 40, 41 wherein the annular surfaces as apparent from FIG. 2 are respectively formed by axial shoulders 51, 52 of the hollow piston 33.

Between the bushing 45 and a shoulder 47 formed between the first piston section 39 and the second piston section 40 a first annular cavity 46 is provided for connecting the first operating connection A with the first tank connection TA. The shoulder 47 initially facilitates a dampened drainage towards the tank connection TA.

The reset spring 49 which presses the hollow piston 33 in an unloaded condition against a non illustrated axial stop into its first end position is arranged in the first annular cavity 46 between an axial surface 63 of the shoulder 47 and the bushing 46 so that a spring preload can be adjusted through an axial positioning of the bushing 46.

Between the second piston section 40 and the third piston section 41 a second annular cavity 50 is provided which connects the operating connections A, B with the pressure medium connection P through the piston outlet 37 as function of the position of the hollow piston 33, in the position of the hollow piston 33 illustrated in FIG. 2 the second operating connection B is connected with the pressure medium connection P since a control edge 59 of the shoulder 52 which is oriented away from the housing outlet 48 has not yet traveled over the transversal bore hole 29 completely. A control edge 60 of the first operating connection A formed at the shoulder 51 and oriented towards the housing outlet 48 has run over the transversal bore hole 28 in a direction of the housing outlet 48 completely so that a flow through from P in a direction towards the operating connection A is prevented. On the other hand side an additional control edge 61 of the second piston section 40 is arranged in the portion of the transversal bore hole 28 which facilitates a flow through of pressure medium from the first operating connection A through the first annular cavity 46 in a direction towards the tank connection TA.

In the second annular cavity 50 the pressure of the pressure medium acts independently from a position of the hollow piston 33 onto the annular surfaces 64, 65 which provides pressure balancing so that the axial force F1 essentially has the same size as a result of a subtraction of the forces F2 and F3. Thus, the force F1 is essentially compensated by the forces F2 and F3 that are provided in the annular cavity 50 between the operating connection A and B.

A third annular cavity 53 provided between the third piston section 41 and the housing outlet 48 facilitates a connection of the second operating connection B with the second tank connection TB as soon as a control edge 62 of the third piston section 41, which control edge is oriented towards the housing outlet 48, is moved against the force of the reset spring 49 in a direction towards the pressure connection P into the portion of the transversal bore hole 29.

As evident the third annular cavity 53 is formed by a shoulder 55 of the third piston section 41 which facilitates providing the annular cavity 53 in a simple manner. A shoulder 56 thus facilitates a dampened drainage towards the tank drain TB.

Arranging a check valve 54 in the housing inlet 36 helps to prevent a back flow of the pressure medium in a direction towards the pressure medium connection P in a simple and safe manner. The check valve 54 can thus be provided for example as a ball check valve or as a plate check valve.

The proposed configuration with the different housing sections 42, 43, 44 of the valve housing 31 and the respective piston sections 39, 40, 41 of the hollow piston 33 with the pressure surfaces A1, A2, A3 configured thereon facilitates reducing manufacturing complexity of the hydraulic valve 30 and in particular to produce and assemble the essentially rotation symmetrical hollow piston 33 in a cost effective manner. Advantageously the hollow piston 33 does not have any bevels which could cause flow disadvantages.

REFERENCE NUMERALS AND DESIGNATIONS 1 stator
2 drive gear
3 stator base element
4 bar
5 intermediary space
6 blade
7 rotor hub
8 rotor
9 pressure cavity
10 pressure cavity
11 channel
13 channel
14 cam phaser
16 hollow tube
18 cam shaft
22 central axis
27 transversal bore hole
28 transversal bore hole
29 transversal bore hole
30 hydraulic valve
31 valve housing
32 bore hole
33 hollow piston
34 piston inlet
35 hollow cavity
36 housing outlet
37 piston outlet
38 plunger
39 first piston section
40 second piston section
41 third piston section
42 first housing section
43 second housing section
44 third housing section
45 bushing
46 first annular cavity
47 shoulder
48 housing outlet
49 reset spring
50 second annular cavity
51 shoulder
52 shoulder
53 third annular cavity
54 check valve
55 shoulder
56 shoulder
57 annular surface
58 circular surface
59 control edge
60 control edge
61 control edge
62 control edge
63 surface
64 annular surface
65 annular surface
A operating connection
A1 pressure surface
A2 pressure surface
A3 pressure surface
B operating connection
D1 first exterior diameter
D2 second exterior diameter
D3 third exterior diameter
F1 force
F2 force
F3 force
F1,3 force
P pressure medium connect on
TA tank connection
TB tank connection

What is claimed is:

1. A hydraulic valve for a cam phaser, the hydraulic valve comprising:
a valve housing which includes a bore hole with shoulders with a first operating medium connection and a second operating medium connection configured as respective transversal bore holes originating from the bore hole with shoulders;
a pressure balanced hollow piston that is arranged within the bore hole with shoulders and axially moveable between a first end position and a second end position;
a piston inlet for axially introducing a pressure medium into a cavity of the hollow piston wherein the piston inlet is connectable with a pressure medium connection, wherein the pressure medium connection is formed by a housing inlet of the valve housing;
a piston outlet leading out of the cavity of the hollow piston and connecting the pressure medium connection with the first operating connection or the second operating connection;
a first tank connection for connecting the first operating connection with a pressure medium reservoir and a second tank connection for connecting the second operating connection with the pressure medium reservoir;
a plunger for axially adjusting the hollow piston through an actuator,
wherein the hollow piston at its end oriented towards the pressure medium connection includes a first piston section with a first small outer diameter, and
adjacent to the first piston section a second piston section with a second large outer diameter, and
a third piston section with a third medium outer diameter,
wherein the first piston section, the second piston section and the third piston
section are respectively moveable in a housing section of the valve housing with a sealing tolerance,
wherein the hollow piston includes a first pressure surface at the first piston section and a third pressure surface at the third piston section for pressure balancing the hollow piston wherein the first pressure surface is loadable with a first axial force and the third pressure surface is loadable with a third axial force, wherein the first axial force and the third axial force is oriented away from the pressure medium connection when the hollow piston is loaded with pressure, wherein a resultant force of the first axial force and the third axial force impacts the hollow piston, wherein a second pressure surface is provided at the second piston section of the hollow piston, wherein the second pressure surface is an only pressure surface of the hollow piston which is loadable with a second axial force that is oriented towards the pressure medium connection, wherein the resultant force and the second axial force impacting the hollow piston from both axial directions are essentially equal in size so that the force at the first piston section is essentially balanced by the second axial force and the third axial force that are provided between the first operating connection and the second operating connection.

2. The hydraulic valve according to claim 1, wherein the first housing section is formed by a bushing that is arranged in the bore hole with shoulders of the valve housing.

3. The hydraulic valve according to claim 2,
wherein a transversal bore hole originating from the bore hole with shoulders is arranged in axial direction after the pressure medium connection as the first tank connection followed by the first operating connection and the second operating connection,
wherein the second tank connection is arranged in the axial direction after the second operating connection,
wherein the second tank connection is formed by an axial housing outlet, and
wherein a first annular cavity for connecting the first operating connection with the first tank connection is provided between the bushing and a shoulder formed between the first piston section and the second piston section.

4. The hydraulic valve according to claim 3, wherein a reset spring for the hollow piston is arranged in the first annular cavity between the shoulder and the bushing.

5. The hydraulic valve according to claim 4, wherein a spring preload force of the reset spring is adjustable through the bushing.

6. The hydraulic valve according to claim 3,
wherein a second annular cavity is provided between the second piston section and the third piston section, and
wherein the second annular cavity is configured for connecting the first operating connection or the second operating connection with the pressure medium connection through the piston outlet as a function of a position of the hollow piston.

7. The hydraulic valve according to claim 6,
wherein a third annular cavity is provided between the third piston section and the housing outlet, and
wherein the third annular cavity is configured as a connection of the second operating connection with the second tank connection.

8. The hydraulic valve according to claim 7, wherein the third annular cavity is formed by a shoulder of the third piston section.

9. The hydraulic valve according to claim 2,
wherein the first pressure surface at the first piston section is formed by a projected circular surface and the second pressure surface and the third pressure surface are formed by annular surfaces oriented towards each other and arranged at the second piston section and at the third piston section
wherein the second tank connection is formed by an axial housing outlet, and
wherein a first annular cavity for connecting the first operating connection with the first tank connection is provided between the bushing and a shoulder formed between the first piston section and the second piston section.

10. The hydraulic valve according to claim 1, wherein the third housing section is formed by a bushing arranged in the bore hole with shoulders of the valve housing.

11. The hydraulic valve according to claim 1,
wherein a transversal bore hole originating from the bore hole with shoulders is arranged in axial direction after the pressure medium connection as the first tank connection followed by the first operating connection and the second operating connection,
wherein the second tank connection is arranged in the axial direction after the second operating connection,
wherein the second tank connection is formed by an axial housing outlet.

12. The hydraulic valve according to claim 1, wherein the first pressure surface at the first piston section is formed by a projected circular surface and the second pressure surface and the third pressure surface are formed by annular surfaces oriented towards each other and arranged at the second piston section and at the third piston section.

13. The hydraulic valve according to claim 1, wherein the housing inlet is arranged axially within the valve housing.

14. The hydraulic valve according to claim 1, wherein the housing inlet is radially arranged within the valve housing.

15. The hydraulic valve according to claim 1, wherein a check valve is arranged in the housing inlet.

16. The hydraulic valve according to claim 1, wherein a plunger is provided that is coupled with the hollow piston.

17. A cam phaser including a stator and a rotor that is rotatable relative to the stator between a first end position and a second end position for adjusting a cam shaft of an internal combustion engine, wherein the cam phaser includes a hydraulic valve according to claim 1 for controlling a rotation of the rotor relative to the stator.

* * * * *